United States Patent
Edlinger et al.

(10) Patent No.: US 6,238,583 B1
(45) Date of Patent: *May 29, 2001

(54) PROCESS FOR PRODUCTION OF A STRUCTURE OF COLOR FILTER LAYER SYSTEM REGIONS

(75) Inventors: Johannes Edlinger, Frastanz; Reinhard Sperger; Helmut Schoch, both of Feldkirch, all of (AT)

(73) Assignee: Balzers Hochvakuum AG, Trubbach (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,751

(22) Filed: Jun. 16, 1998

(30) Foreign Application Priority Data

Jul. 2, 1997 (CH) .................................... 1595/97

(51) Int. Cl.$^7$ ................................ B05D 5/06; B05D 1/32
(52) U.S. Cl. ........................... 216/24; 427/164; 427/162; 427/165
(58) Field of Search .................................... 427/164, 162, 427/165; 216/24, 25

(56) References Cited

U.S. PATENT DOCUMENTS 3,981,568 * 9/1976 Bartolomei ........................ 350/317

FOREIGN PATENT DOCUMENTS

3013142 * 10/1981 (DE) .

OTHER PUBLICATIONS

USPTO Translation of German patent 3013142, Oct. 8, 1981.*

* cited by examiner

Primary Examiner—Katherine A. Bareford
Assistant Examiner—Michael Cleveland
(74) Attorney, Agent, or Firm—Notaro & Michalos P.C.

(57) ABSTRACT

A first coating layer structure $3_a$ is produced by coating, alignment, exposure and development. On this coating layer structure $3_a$ is deposited the first colour filter layer system $5_{a0}, 5_{a1}$. Over the entire colour filter layer system 5 is deposited a sacrificial layer 7. Outside the vacuum container the coating layer structure is dissolved and with it the colour filter layer system regions $5_{a0}$ are removed. A further process of coating, alignment, exposure and development is carried out to create a coating layer structure $3_b$. Next the second colour filter layer system $5_b$ and the second sacrificial layer $7_b$ are deposited. Thereby the sacrificial layer 7 withstands the step of dissolving the coating and can be removed finally without damaging the colour filter layer system regions. Accordingly, any flakes 9 remaining from the lift-off are removed with the sacrificial layer 7.

5 Claims, 2 Drawing Sheets

PROCESS FOR PRODUCTION OF A STRUCTURE OF COLOR FILTER LAYER SYSTEM REGIONS

FIELD AND BACKGROUND OF THE INVENTION

The present invention concerns a process for the production of a structure of colour filter layer system regions where:

- a coating layer structure with coated surface regions and coating-free regions is produced on a substrate;
- a colour filter layer system is deposited on the coating layer structure;
- the coated surface regions with the overlying colour filter layer system regions are removed.

Such a production system is known as the lift-off process. It is used for example to produce red-green-blue colour filter layer system structures, in particular for LCD or CCD production. The colour filter layer systems can structured by pixel structuring or strip structuring.

Often in such systems, between the colour filter layer system regions is applied an opaque layer of material, usually chromium, which covers the filter layer system transitions and is usually known as the black matrix structure.

In general the said lift-off technology is advantageous from the point of view of commercial production as relatively few process stages are necessary in a vacuum. In relation to this technology, reference is made to US-A-3 914 464 or DE-30 13 142. It is also known to produce metallic layer structures using the lift-off technique in semiconductor production for example. Such metallic layer structures, for example approximately 1 μm thick, can be removed like a foil during lift-off without disintegrating. In this latter technique it is therefore necessary to produce the lift-off coating structure such that its side surfaces overhang. This ensures that the metal coating regions deposited on the coating-free regions are not also removed during the lift-off process. Overhanging coating structures can however only remain as such if the subsequent coating with the said metal coating is applied almost vertically to the base or substrate surface. When the coating structure is then dissolved during the lift-off process, the metal layer to be removed remains as a cohesive structure and during removal very few particles are produced which can be deposited on the remaining layer structures applied to the coating-free regions.

In this respect the lift-off process behaves totally differently on dielectric or generally brittle filter layer systems: on the one hand the overhanging coating layer structures can be omitted as the said filter layer systems are brittle and cannot be removed as a skin. They crumble into multiple small flakes during the lift-off process. At the structure edges, automatic layer system break points occur. The flakes can be deposited on the remaining structure where they frequently land, i.e. due to molecular forces they become attached to the surface of the remaining structure and are very difficult to remove, which can often cause damage to the filter layer system structure, for example the red-green-blue filter structure (RGB).

SUMMARY OF THE INVENTION

The problem of the present invention is to propose a process of the type described initially which prevents such defects on the end product. This is to be achieved with minimum cost and maximum simplicity.

The problem is solved in the said process by its formation according to the characterising part of claim 1.

Accordingly, on each coating with one of the dielectric colour filter layer systems, for example in each case an R or G or B layer system, in addition a sacrificial layer is applied. The sacrificial layer material is firstly a material which withstands the lift-off or removal step of the coating regions with the colour filter layer system lying on this, and secondly the material for the sacrificial layer is selected such that it can be removed again from the colour filter layer system regions without damaging them. The application of the sacrificial layer according to the invention before the lift-off stage primarily has the effect that flakes are not deposited on the remaining filter layer system regions but on their sacrificial layer. A corresponding bonding only occurs with the latter and the flakes are removed in the removal stage of the sacrificial layer from the remaining filter layer system regions.

At the same time, the provision of the sacrificial layer according to the invention achieves a further important advantage:

The sacrificial layer on a filter layer system region can be used directly as a lift-off layer as, without providing a further coating layer structure, a subsequent colour filter layer system to be applied is applied directly onto the preceding sacrificial layer. This is dissolved in the lift-off stage as the material of the sacrificial layer must be removable without damaging the filter layer system materials. Thus in the production of structured multicolour filter layer systems, one process sequence consisting of mask coating/alignment, exposure/development can be omitted, which leads to a substantial increase in the yield of structured multicolour filter layer systems per time unit and in particular contributes to their low cost production. Thus in the production of a RGB pixel structure for example there are two coating lift-off processes and one sacrificial layer lift-off process.

The sacrificial layer preferably consists of a metal or dielectric, preferably Cr, Al or $Y_2O_3$.

If it is necessary to measure spectrally the colour filter layer system regions already deposited under the sacrificial layer, it is proposed that the sacrificial layer be structured partially transparent to allow this control, where preferably in production of the sacrificial layer from a metal, such as in particular Cr, this is formed maximum 10 nm thick. From this aspect the provision of the sacrificial layer of $Y_2O_3$ is also extremely advantageous as this dielectric layer is totally transparent. If however a spectral control of the deposited colour filter layer systems is not required, an opaque sacrificial layer can be provided, for example by depositing a chromium layer more than 10 nm, e.g. 90 nm, thick.

As initially stated, often a black matrix layer is provided in a structured fashion both between remote colour filter layer system regions and at regions abutting in their peripheral areas. From this aspect there is a further advantage of the process according to the invention:

If namely a sacrificial layer is applied to the last colour filter layer system applied, advantageously its material is suitable as a black matrix layer material e.g. in particular chromium. Then the sacrificial layer as a black matrix layer is not removed completely but in structured fashion such as by etching. Otherwise, when namely no sacrificial layer is to be applied on the last colour filter layer system after which no lift-off process follows, and sacrificial-layer regions remain only on the colour filter layer system regions previously applied, an additional black matrix layer for example of Cr is applied and the latter removed in structured fashion together. with the regions of the remaining sacrificial layer.

BRIEF DESCRIPTION OF THE INVENTION

The invention is now explained using the examples in the drawings. Here:

Figure 2:
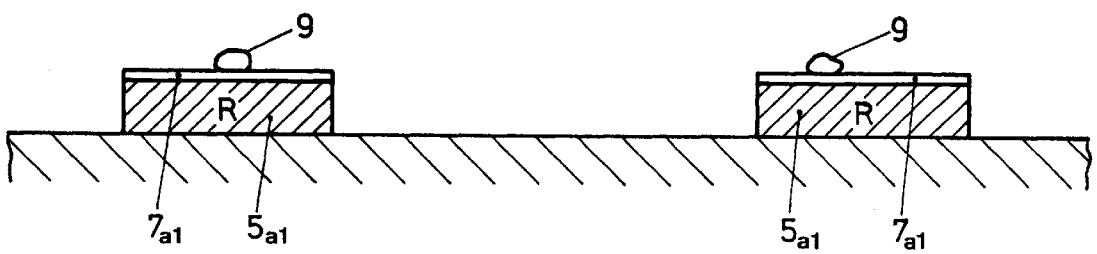
FIG. 2 shows the structure according to FIG. 1 after performance of the lift-off stage.
Figure 3:
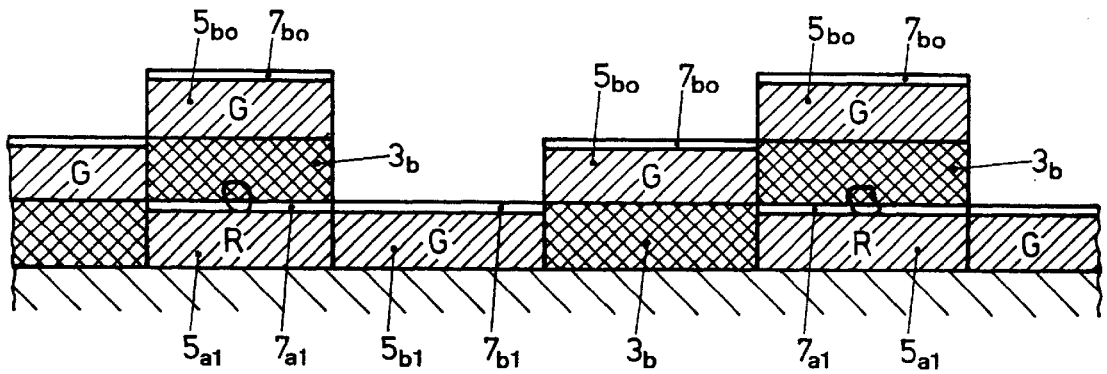
Figure 4:
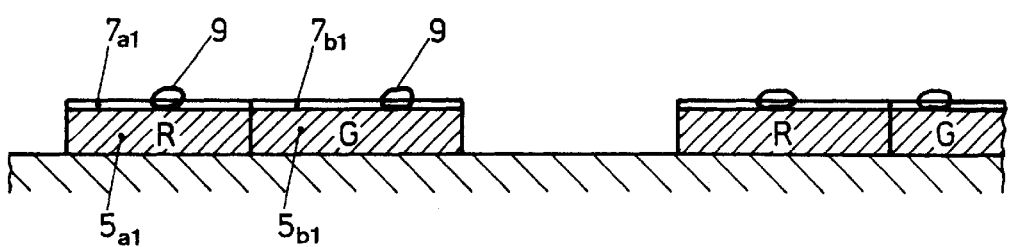
Figure 5A:
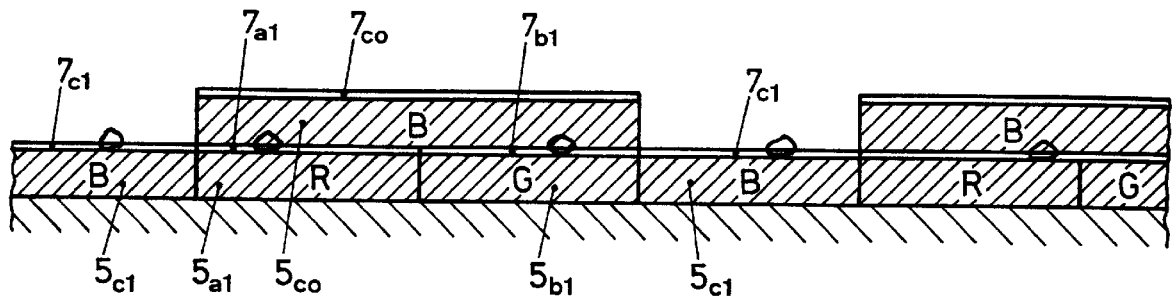
Figure 6A:
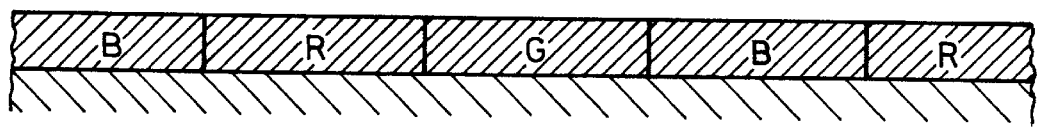
Figure 5B:
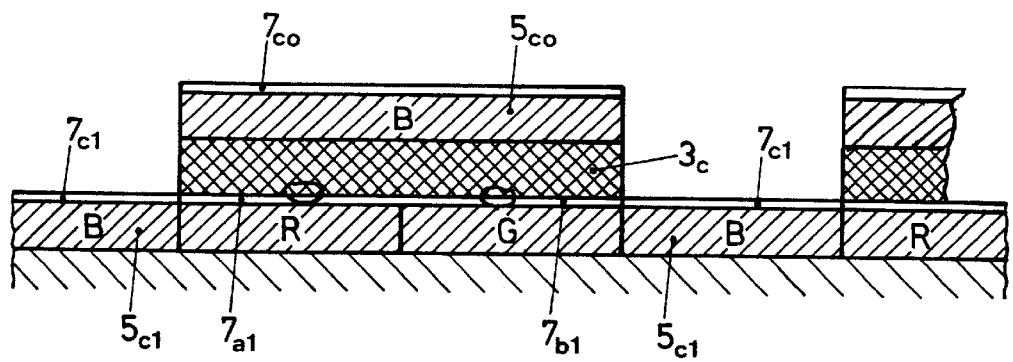
Figure 6B:
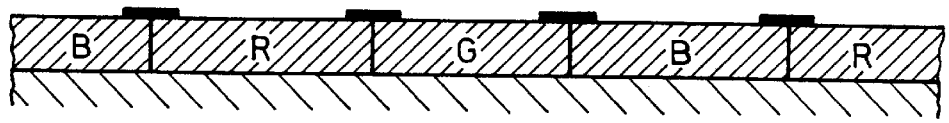

FIG. 3 on the basis of the structure in FIG. 2, shows the structure after application of a further lift-off coating layer and a further filter system (e.g. green filter layer system);

FIG. 4 shows the structure according to FIG. 3 after the lift-off stage;

FIG. 5a on the basis of the structure in FIG. 4, shows the application of a third colour filter layer system (e.g. blue filter layer system) without provision of a further coating layer structure for the third lift-off stage;

FIG. 5b on the basis of the structure according to FIG. 4, shows an alternative process in which is applied the third colour filter layer system with associated sacrificial layer over a further lift-off coating layer structure;

FIG. 6a shows the structure according to 5a after dissolution of the sacrificial layer serving simultaneously as a lift-off layer, and FIG. 6b shows, on the basis of the structure in 5b, the structure after lift-off by dissolution of the coating layer and with the use of the sacrificial layer simultaneously as a structured black matrix layer.

DESCRIPTION OF THE PREFERRED EMBODIMENTS

Figure 1:
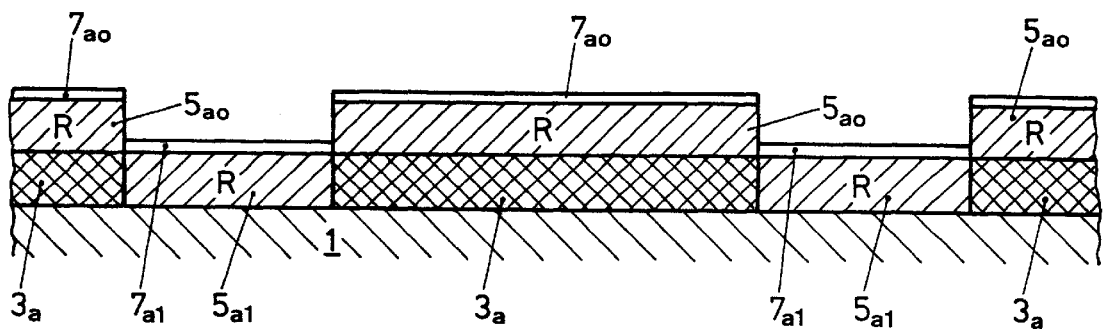
FIG. 1 shows, during the colour filter layer system production, the structure after deposition of a first colour filter layer system (e.g. a red filter system) with sacrificial layer provided according to the invention and before the first lift-off stage.

According to FIG. 1, on a substrate 1 is applied first a coating layer structure $3_a$ produced by coating, alignment, exposure and development. On the coating layer structure $3_a$ is deposited the first colour filter layer system, for example red R, and regions $5_{a0}$ and $5_{a1}$ formed. Over the entire colour filter layer system 5 is deposited the sacrificial layer 7 with regions $7_{a0}$ and $7_{a1}$. As stated the sacrificial layer 7 preferably consists of a metal or a dielectric in particular Cr, Al or $Y_2O_3$. The sacrificial layer is deposited in the same vacuum coating process as the colour filter layer system 5, i.e. without the workpieces leaving the vacuum production chamber.

According to FIG. 2, on the basis of FIG. 1, outside the vacuum container the coating structure $3_a$ is dissolved preferably by means of acetone or NMP (N-methyl-2-pyrrolidone) and thus the colour filter layer system regions $5_{a0}$ and sacrificial layer regions $7_{a0}$ are removed. Any flakes occurring lie, as shown by 9 on FIG. 2, on the sacrificial layer regions $7_{a1}$.

On the basis of the result in FIG. 2, a further coating, alignment, exposure and development is carried out in accordance with FIG. 3, and coating layer structure $3_b$ is created.

Now the second colour filter layer system $5_b$, for example the green colour layer system G, is applied to the coating layer structure $3_b$ and forms the regions to be removed $5_{b0}$ and the regions to remain $5_{b1}$. The second sacrificial layer is deposited over the colour filter layer system $5_b$ corresponding to regions $7_{b0}$ and $7_{b1}$.

On the basis of FIG. 3, FIG. 4 shows the resulting structure after dissolution of the lift-off coating $3_b$ where again flakes 9 may occur.

Starting from FIG. 4 there are now two possibilities for further production, both advantageous. One is shown in FIGS. 5a, 6a, and the other in FIGS. 5b, 6b.

In a first variant, on the basis of the structure in FIG. 4, on the remaining sacrificial layer $7_{a1}$, $7_{b1}$ is deposited directly the third colour filter layer system, for example the blue filter system B, corresponding to regions $5_{c1}$ and $5_{c0}$. Now the remaining sacrificial layer with regions $7_{a1}$ and $7_{b1}$ is used as the lift-off layer and dissolved. The solvent used for example for Cr or $Y_2O_3$ as sacrificial layer material can be ceric ammonium nitrate.

The dissolution of the sacrificial layer 7 acting as lift-off layer also removes the flakes 9 embedded in the colour filter layer system $5_{c0}$ to be removed.

The result is the structure in FIG. 6a, in the production of which both flake contamination is prevented and one process sequence of coating, alignment, exposure, development is omitted.

With the procedure according to FIGS. 5a and 6a, if a black matrix structure is required this must be produced on the structure according to FIG. 6a by a further coating and structuring.

On the basis of FIG. 4, the alternative procedure according to FIG. 5b consists of first providing a further coating, alignment, exposure and development of a lift-off coating mask corresponding to regions $3_c$. The third colour filter layer system $5_c$ with regions $5_{c0}$ and $5_{c1}$ and the sacrificial layer $7_c$ with regions $7_{c0}$ and $7_{c1}$ are then deposited. Then the coating layer $3_c$ is removed in a conventional lift-off stage, and of the structure according to FIG. 5b there remains the colour filter system structure with complete sacrificial layer $7_{c1}$, $7_{b1}$, $7_{a1}$ over this. This can now for example be removed by dissolution, giving the structure in FIG. 6a. In this case however, as shown in FIG. 6b, it can be removed directly as a black matrix layer only in a structured manner such as for example by etching. Thereby in this case, i.e. if a black matrix structure is desired, there is no need to deposit the latter. Again in this second procedure, firstly the flake cleaning is achieved as the flakes are removed at the same time as the sacrificial layer is dissolved, and if required the deposition of an additional black matrix layer is omitted. With the present invention the following advantageous effects are achieved:

low cost production of colour filter layer system structures such as in particular for LCD or CCD production, self-cleaning, omission of one production stage, either coating, alignment, exposure, development, or the deposit of a black matrix layer.

Instead of filter layer system regions, the process according to the invention can be used to deposit metal regions of metal region structures.

For a colour filter layer system or filter elements having a selected number n of different colour filter elements or regions, one less than all of the n elements or regions are produced by means of the coating lift-off steps and the $n^{th}$ or last of the selected number of elements or regions is deposited by means of a sacrificial layer lift-off.

What is claimed is:

1. A process for producing a structure of color filter elements on a carrier surface, comprising the sequential steps of:

depositing a first lift-off coating;

patternwise exposing, and developing the first lift-off coating to expose first areas of the carrier surface;

depositing a first color filter layer onto the first lift-off coating and the first exposed areas of the carrier surface;

depositing a first sacrificial layer on the first color filter layer;

removing the first lift-off coating and the portions of the first color filter layer and first sacrificial layer deposited thereon, thereby forming a first color filter element;

depositing a second lift-off coating;

patternwise exposing, and developing the second lift-off coating to expose second areas of the carrier surface;

depositing a second color filter layer onto the second lift-off coating and the second exposed areas of the carrier surface;

depositing a second sacrificial layer on the second color filter layer;

removing the second lift-off coating and the portions of the second color filter layer and second sacrificial layer deposited thereon, thereby forming a second color filter element and remaining exposed areas of the carrier surface;

depositing a third lift-off coating;

patternwise exposing, and developing the third lift-off coating to expose the remaining areas of the carrier surface that have not been coated with filter elements;

depositing a third color filter layer onto the third lift-off coating and the remaining exposed areas of the carrier surface;

depositing a third sacrificial layer on the third color filter layer; and removing the third lift-off coating and therewith the portions of the third color filter layer and the third sacrificial layer deposited on the third color filter layer, thereby leaving the third sacrificial layer on the unremoved portions of the third color layer; and removing at least a part of the first, second and third sacrificial layers that are present on the first, second and third color filter elements on the carrier surface.

and removing the sacrificial layer;

wherein the sacrificial layer material is selected to withstand the removal of the lift-off coatings.

2. A process according to claim 1, wherein each sacrificial layer is removed by dissolution.

3. A process according to claim 1, wherein each sacrificial layer is a metal or a dielectric.

4. A process according to claim 1, wherein the material of at least one of the sacrificial layers is black matrix material.

5. A process according to claim 1, wherein the filter elements and the first sacrificial layer are produced in a vacuum which is uninterrupted during the process.

* * * * *